United States Patent [19]

Huff et al.

[11] 4,283,109
[45] Aug. 11, 1981

[54] METHOD AND APPARATUS FOR MAKING WIDE EXIT PUPIL VIEWABLE HOLOGRAMS

[76] Inventors: Lloyd Huff, 439 Walsingham Ct., Dayton, Ohio 45429; Richard L. Fusek, 832 Cliffside Dr., New Carlisle, Ohio 45344

[21] Appl. No.: 895,121

[22] Filed: Apr. 10, 1978

[51] Int. Cl.³ .................. G03H 1/30; G03H 1/22
[52] U.S. Cl. .................. 350/3.76; 350/3.83; 350/3.84
[58] Field of Search .................. 350/3.76, 3.75, 3.83, 350/3.84, 3.85

[56] References Cited

U.S. PATENT DOCUMENTS

| | | | |
|---|---|---|---|
| 3,625,584 | 12/1971 | St. John | 350/3.83 |
| 3,834,785 | 9/1974 | Kimura | 350/3.85 |
| 4,039,245 | 8/1977 | Yano | 350/3.76 |
| 4,067,638 | 1/1978 | Yano et al. | 350/3.76 |

Primary Examiner—Ronald J. Stern
Attorney, Agent, or Firm—Biebel, French & Nauman

[57] ABSTRACT

In a method and apparatus for recording a holographic image on a photosensitive medium or film which is capable of being viewed from a wide vertical viewing angle when illuminated by incoherent light, a source of coherent light (10) is divided by splitter (14) into a reference beam (16) and an image or object beam (18). The image beam is directed toward the object, either a transparency (20) or a three-dimensional object (20a), and the image thereof is focused in the vertical plane by means of an anamorphic lens (30) onto a vertical dispersion element (35) and the image thereon is gathered and focused in the vertical plane by means of anamorphic lenses (36 and 38) onto the film (40). In the horizontal plane, the image is focused by an anamorphic lens (42) onto a horizontal exit pupil forming means which may include horizontal dispersion element (45) and the light therefrom is directed onto the film (40). The reference beam (16) is directed onto the film from either the back or the front at a predetermined angle in a vertical plane. The holographic image may be recorded in full color by simultaneously or sequentially generating coherent light in the primary colors and directing the reference beam of each color onto the film at a unique predetermined angle in a vertical plane. The image is reconstructed by directing incoherent light onto the film at the same angles in the vertical plane as the reference beam.

37 Claims, 13 Drawing Figures

METHOD AND APPARATUS FOR MAKING WIDE EXIT PUPIL VIEWABLE HOLOGRAMS

BACKGROUND OF THE INVENTION

Holograms viewable with nonlaser light sources have been produced with the image plane technique wherein the object is focused at or near the plane of the recording medium. Motion picture films have been holographed using this technique to produce moving stereoscopic images. In this technique, the film frames are imaged onto the hologram film to form narrow vertical strip holograms arranged in a contiguous manner. A plurality of the strip holograms provides a full view of the image in the horizontal plane. A full view of the image in the vertical plane is observed due to the chromatic dispersion properties of the hologram. These properties produce a rainbow colored image (rather than black and white or true color) which is viewable only over a limited range in the vertical direction.

The object of this invention is the production of a hologram of either a transparency or diffusely reflecting three dimensional object which has wide exit pupils in both the vertical and horizontal planes, can be viewed with a nonlaser illumination source, and is capable of reproducing the image in full color. Diffusers or directional dispersing elements are used in conjunction with anamorphic optics to achieve wide exit pupil angles. The techniques described in this application can be used to produce black and white or full color holograms of film transparencies or three dimensional objects which can be viewed with nonlaser light sources and display a wide viewing angle in the vertical direction. Similar techniques and concepts to extend viewing angles in holograms of different configurations are shown in U.S. Pat. Nos.: 3,625,584; 3,834,785 and 4,067,638. Holograms produced in accordance with this invention are uniquely different, however: these holograms provide a large aperture, wide angle view of the image which can be either in front or in back of the film, and no optical elements other than the hologram film and illumination source are required to view the image.

SUMMARY OF THE INVENTION

This invention relates to a process for the production of holograms with a wide vertical exit pupil viewable with a conventional (nonlaser) light source. This invention is useful with single frame and motion holograms, both in black and white and in full color.

In the present invention, the hologram is formed by illuminating an object with coherent light, focusing the image of the object in the vertical plane onto a vertical dispersion element and thereafter focusing the image on said dispersion element onto a photosensitive medium such as photographic film. In the horizontal plane, the light from the object is directed onto a horizontal exit pupil forming means and the light therefrom directed onto the film. A reference beam is simultaneously directed onto the film in the vertical plane.

Several embodiments of the invention are described but all have the following common and essential features: (1) in the vertical plane, the image is focused on a vertical dispersion element and then onto the film so that the resulting hologram behaves as an image plane hologram, and it can therefore be viewed with a conventional (non-laser) light source; (2) in the horizontal plane, the reconstructed image is separated from the plane of the film, and may be virtual and behind the film or real and in front; and (3) every part of the image is recorded on the film, and the full horizontal extent of the image may be viewed through every point of the hologram.

The image recorded on the hologram may either be the image of a real, three-dimensional object, or the image on a photographic transparency. The vertical dispersion element may be a diffusing screen, a lenticular screen, a ruled transmission diffraction grating or a holographic diffraction grating. The purpose of the vertical dispersion element is to create a hologram having a wide vertical exit pupil which may be viewed in a wide vertical range without the typical rainbow effect common to conventional image plane holograms viewed with white light.

When a hologram produced by the method is illuminated with white light the resulting image is black and white, not rainbow colored. This allows the production of a full natural color image by superimposing three holographic images recorded with laser light of the three primary colors and illuminating the hologram with color filtered light from three conventional (nonlaser) sources placed at the corresponding reference beam angles.

The horizontal exit pupil forming means producing features (2) and (3) cited above may consist of a cylindrical lens, it may include a diffusing screen, and in one embodiment, it may be the same diffusing screen used as the vertical dispersion element; it may also include a lenticular screen.

In a preferred embodiment of the invention, an image on a photographic transparency is recorded on photographic film in full color according to the following process. A source of coherent light for generating each of the primary colors is split into an object beam and a reference beam. The object beam is directed through the transparency, with the image thereof in the vertical plane being focused by means of an anamorphic lens onto a vertical dispersion element in the form of a lenticular screen. The light which is dispersed vertically by that screen is collected by another lens system and focused onto the plane of the photographic film. The image on the transparency in the horizontal plane is focused by means of another anamorphic lens onto a horizontal dispersion element, another lenticular screen, located closer to the film than the vertical dispersion element, and the light therefrom is collected and directed, but not focused, onto the photographic film. The dispersive power of the horizontal dispersion element is such that light in the horizontal plane from all parts of the horizontal dispersion element is recorded on the film. The reference beams, one for each of the primary colors, are directed onto the photographic film at specified angles in the vertical plane, the angles being chosen so as to prevent cross-talk images.

In one modification, an additional lens is placed between the horizontal dispersion element and the film to cause the image to be formed in front of the film, closer to the observer. In a further modification, both the vertical and the horizontal dispersion means may be a single diffuse screen with an anamorphic lens means placed between the screen and the film to focus the image in the vertical plane onto the film while allowing the light from the screen merely to be directed toward the film in the horizontal plane. This system is not as efficient optically but will produce a hologram having the desired characteristics. In still another modification the vertical dispersion element is placed adjacent the photographic film.

In the embodiments described above, the reference beams are directed toward the film at specified angles in the vertical plane on the same or on opposite sides of the film as the object beam.

The hologram may be a narrow vertical strip, and a series of these strips may be placed side by side to produce a wide angle stereogram or a three-dimensional motion scene.

When using the present invention to make motion holograms, a mask having a vertical slit formed therein is placed adjacent the film to define the limits of an individual frame. The image on the transparency is recorded holographically on the film and the film is then advanced by at least the slit width prior to each successive exposure.

Accordingly, it is an object of this invention to provide a method and apparatus for making a hologram which is capable of being viewed from a wide vertical angle when illuminated by incoherent light; to provide a method and apparatus as described above for producing full color holograms; and to provide wide verticle angle viewable holograms either black and white or full color which may be either single frame or multiplex holograms of three-dimensional motion scenes.

Other objects and advantages of this invention will be apparent from the following description, the accompanying drawings and the appended claims.

BRIEF DESCRIPTION OF THE DRAWINGS

FIG. 1a is a modification of a horizontal exit pupil forming means used in FIG. 1;

FIG. 1b is another modification of a horizontal exit pupil forming means used in FIG. 1 wherein the image is formed between the viewer and the hologram;

FIG. 5 illustrates the method of illuminating and viewing the hologram produced with the apparatus of FIGS. 1 and 2;

DESCRIPTION OF THE PREFERRED EMBODIMENTS

Figure 1:
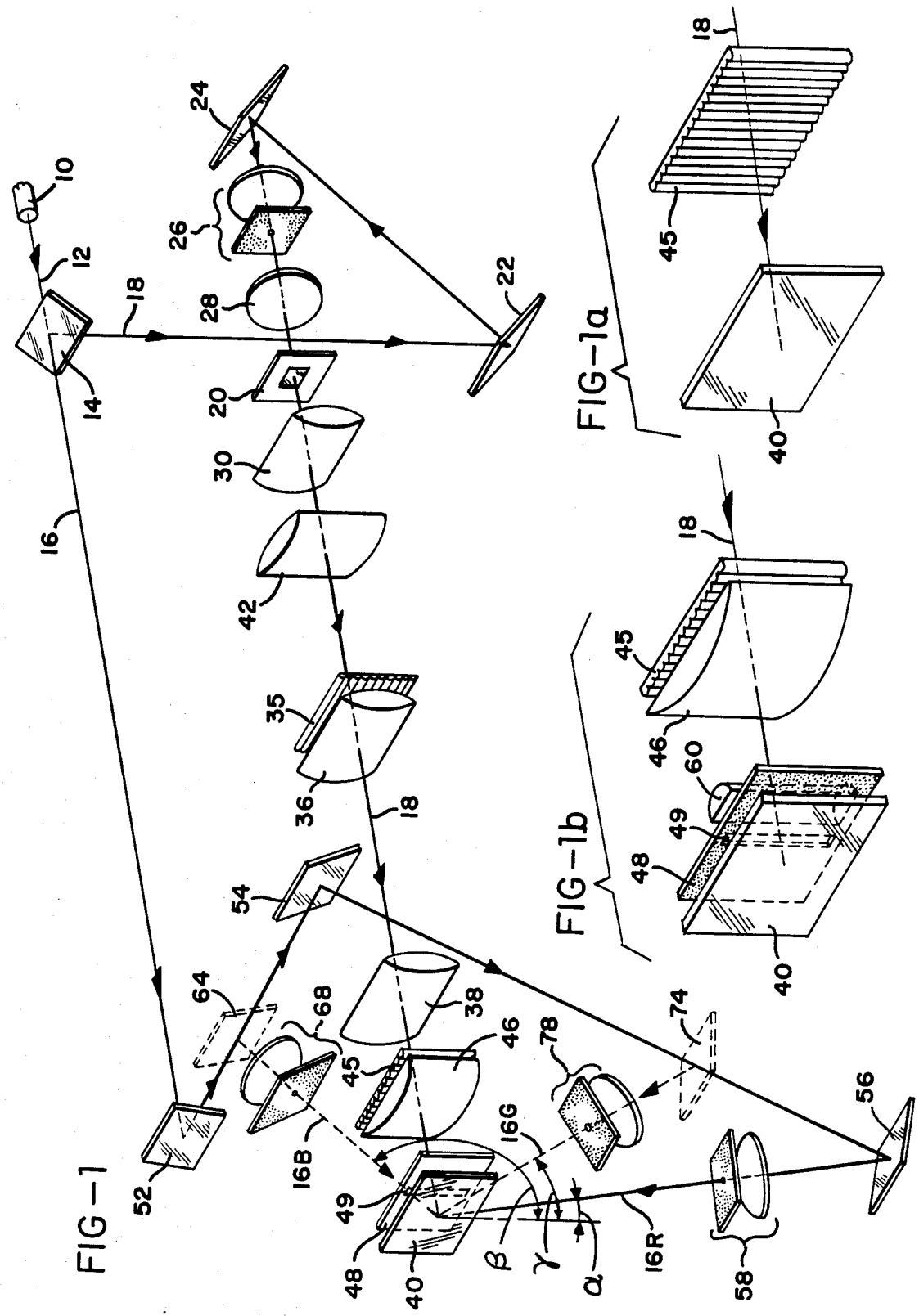
FIG. 1 is a perspective view of a preferred embodiment of the invention for making holograms having a wide vertical exit pupil.

Referring now to the drawings which show the preferred embodiments of the invention and particularly to the embodiment shown in FIG. 1, a laser 10 provides a means for generating a coherent beam of light 12 which is directed to a variable beam splitter 14 where it is split into a reference beam 16 and an image or object beam 18. The image beam is directed toward a transparency 20, the object to be recorded in this embodiment, by means of fixed mirrors 22 and 24 and through spatial filter 26 and spherical condensing lens 28.

The image on the transparency in the vertical plane is focused by means of an anamorphic lens 30 onto vertical dispersion means 35. As shown in FIG. 1, the anamorphic lens 30 is a cylindrical lens, although it is to be understood that other forms of lenses may be used.

The image in the vertical plane on the vertical dispersion element 35 is then focused by means of anamorphic lenses 36 and 38 onto a photosensitive medium such as photographic film 40.

In the horizontal plane, the image of the transparency 20 is focused by means of an anamorphic lens 42 onto a horizontal dispersion element 45 located between the vertical dispersion element 35 and the film 40. The focal length and position of lens 42 are chosen so that the image size on the horizontal dispersion element 45 is correct with respect to the image size in the vertical plane of the film 40. The light on the horizontal dispersion element 45 is directed by means of lens 46 through a mask 48 onto the film 40. The horizontal dispersion element 45 and the lens 46 form the horizontal exit pupil forming means.

The reference beam 16 is directed by means of a fixed mirror 52 and additional fixed mirrors 54 and 56 through a spatial filter 58 onto the film 40 at a predetermined angle in the vertical plane. As shown in FIG. 1, the reference beam is incident on the film on the same side as the image beam.

When recording full color holograms, the laser 10 may generate the three primary colors in sequence, and the reference beams for each of these colors will be directed onto the film at different angles in the vertical plane. The reference beam 16R for the color red, for example, is represented by the solid line in FIG. 1 and is incident on the film at angle $\alpha$. The reference beam 16B for the color blue is directed by means of mirror 64 installed in the reference beam path through spatial filter 68 onto the film at angle $\beta$; and the reference beam 16G for the color green is directed by mirror 74 and through spatial filter 78 onto the film 40 at angle $\gamma$.

Figure 2:
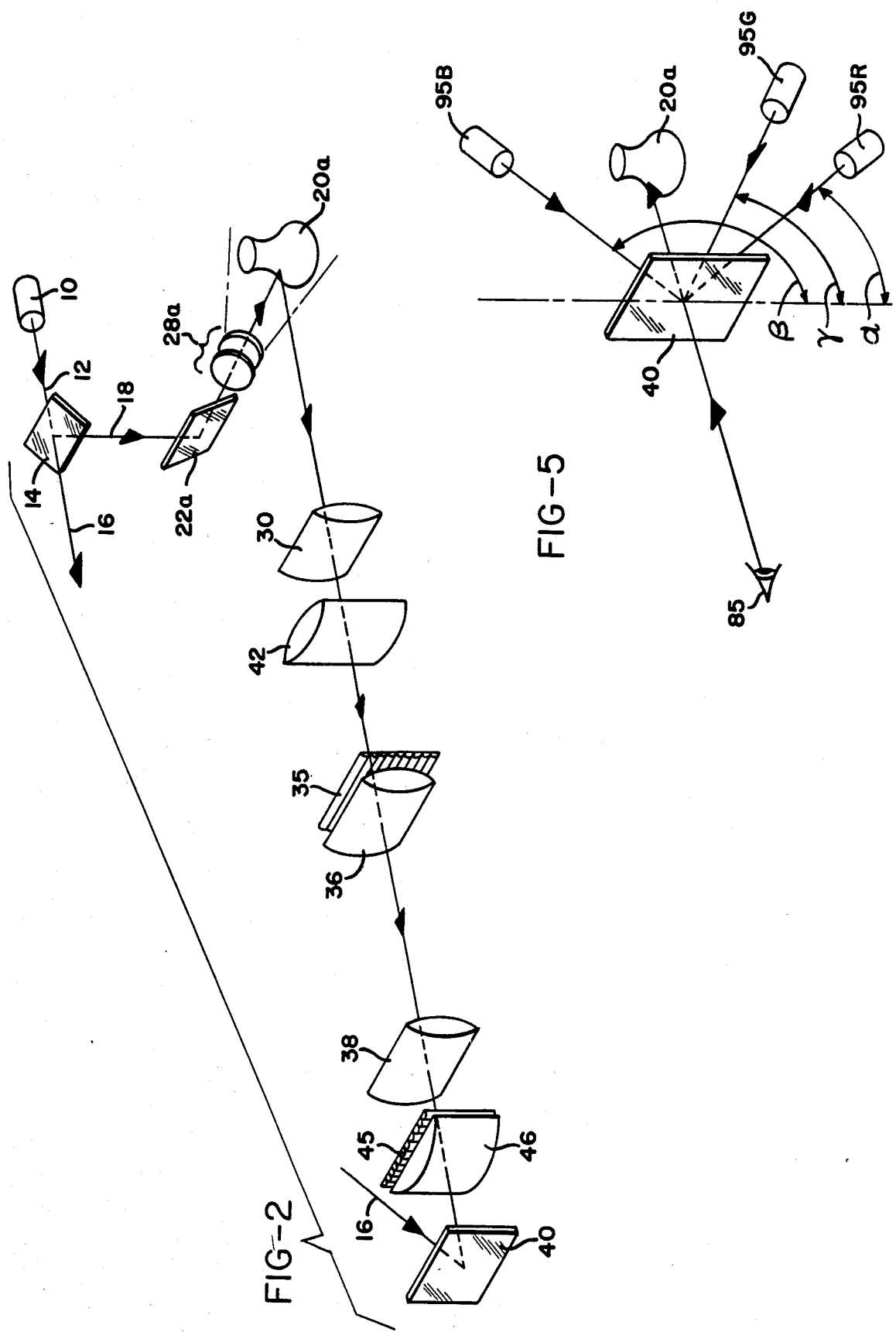
FIG. 2 is a perspective view similar to FIG. 1 but showing the apparatus for recording of the image of a three-dimensional object.

In FIG. 2, the object 20a to be recorded on the hologram 40 is three-dimensional, and coherent light is directed onto the object by means of mirror 22a and lens system 28a. In the vertical plane, the image of the object is focused onto the vertical dispersion element 35 by lens 30, and in the horizontal plane the image is focused onto the horizontal dispersion element 45 by lens 42, as in the example above.

In FIGS. 1-4, lenses 30, 36 and 38 are anamorphic lenses which have power only in the vertical plane, and lenses 42 and 46 are anamorphic lenses which have power only in the horizontal plane. Lens 28 is a spherical condensing lens and serves only to condense the light from spatial filter 26 through the subject transparency 20.

The vertical dispersion element 35 may be any element which disperses or diffuses rays incident upon it in the vertical plane, while having no optical effect on the rays in the horizontal plane. Such an element may be physically manifested by a lenticular screen with the grooves running in the horizontal plane, by a conventional diffraction grating, or by a holographic grating. The real image forming on element 35 by lens 30 is re-imaged onto the hologram film by cylindrical lens 38.

Modifications of the horizontal exit pupil forming means are shown in FIGS. 1a and 1b. In FIG. 1a a lenticular screen is used alone. A full image, single frame hologram may be recorded with this modification, or it can be used with the slit mask to produce a motion hologram or stereogram with a contiguous succession of vertical strip holograms. In FIG. 1b a cylindrical lens 60 is placed adjacent the slit mask 48 and the film 40 to re-image the image on lenticular screen 45 to the other side of the film in the horizontal plane. This places the image in front of the film when the hologram is viewed.

Figure 3:
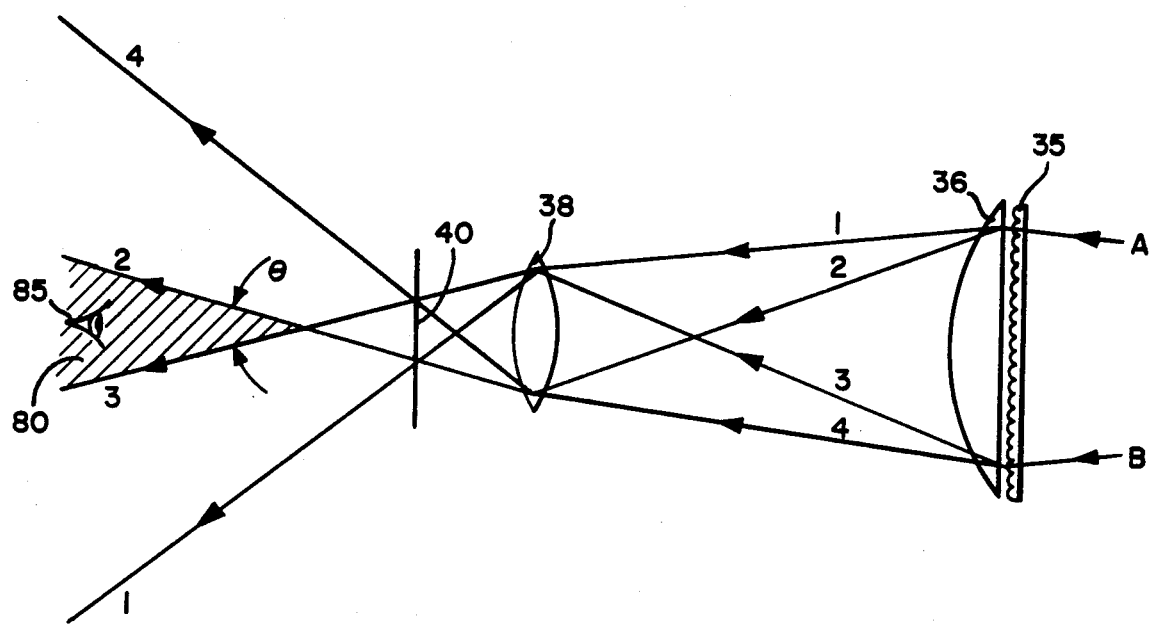
FIG. 3 is a ray diagram illustrating the function of the vertical dispersion element.

FIG. 3 illustrates how a wide exit pupil in the vertical plane is formed by this optical process. Extremal rays A and B from the projection lens 30 are dispersed in the vertical plane by the vertical dispersion element 35 into ray wedges bounded by rays 1 and 2 and 3 and 4. The cylindrical lens 36 directs these ray wedges along the paths shown by rays 1 and 2 and 3 and 4 in such a manner that both ray wedges are fully intercepted by lens 38. All of the rays passing through element 35 and lens 36 are therefore incident upon the image area of the film and contribute to the exposure of the film. Lens 36, therefore, serves only as a field lens, and its sole purpose is to conserve laser light. Without lens 36, the dispersive power of element 35 would have to be sufficient to generate ray 2 and ray 3 on its own. Since any practical dispersive element would disperse rays into a wedge centered about rays A and B, most of the light would then not intercept lens 38 and would lead to an inefficient system from a light economics point of view.

The light wedges bounded by rays 1 and 2 and 3 and 4, are focused onto the hologram film 40 at the image plane by lens 38. After passing through the image, the light wedges bounded by rays 1 and 2 and 3 and 4 overlap in the shaded region 80 shown in FIG. 3 which has an included angle denoted by $\theta$. An observer 85 located anywhere within this shaded region will be able to view the full extent of the image. The shaded region thus represents the vertical exit pupil and $\theta$ is the vertical exit pupil angle.

Figure 4:
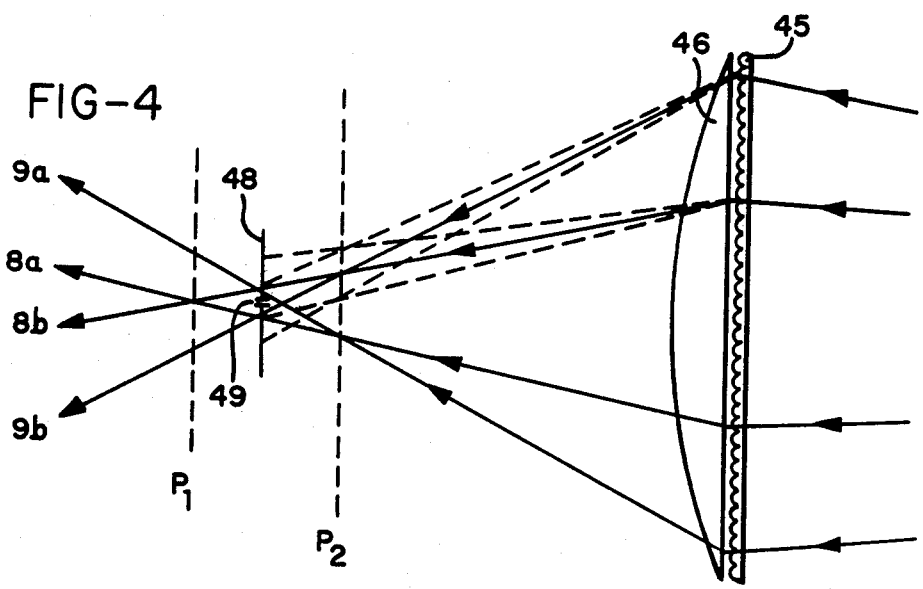
FIG. 4 is a ray diagram illustrating the function of the horizontal exit pupil forming means.

The ray diagram in FIG. 4 illustrates the function of the horizontal dispersion element 45 and cylindrical lens 46, however, before describing this in detail, it should be pointed out that a multiplexing process to produce a motion holographic image can be accomplished with the use of lens 46 alone. Rays from the projection lens 42 are converged by lens 46, and, because of aberration, the rays will not be brought to a perfect line focus but will be converged to a band of least confusion. This is shown in FIG. 4 by the solid rays 8a and 8b near the center of the lens coming to a focus at a greater distance than the solid rays 9a and 9b near the edge of the lens. In practice, the width of the band of least confusion can be wider than the desired framewidth in the motion hologram.

It is possible, however, to achieve the desired effect by placing the film near the light focus so that it is exposed over a band considerably wider than the desired framewidth between exposures and thereby multiply exposing the film. Since diffraction efficiency decreases with increasing number of exposures, it would be desirable to place the film at the plane of least confusion, i.e., at the plane where the ray bundle band is the narrowest. It is observed in practice, however, that whenever the film is placed within the region bounded by planes P1 and P2 (these planes are defined by intersection lines formed by rays from the edge and center of the lens crossing) double exposure interference effects produce dark bands in the image seriously degrading the image quality. To avoid this effect, it is necessary to place the film in a region where no rays from the lens cross, i.e., either to the left of plane P1 or to the right of plane P2. To eliminate these interference effects and limit the number of exposures to a reasonable value, a low f number lens 46 with quite small aberration is required.

The stringent need for a good quality low f number cylindrical lens can be greatly relaxed with the use of a horizontal dispersion element 45 in conjunction with the cylindrical horizontal exit pupil forming lens 46. In FIG. 4, a slit 49 of the desired framewidth is placed near the minimum focal band of lens 46. The film is singly exposed through this slit 49 in mask 48 and the film is translated in the horizontal direction one framewidth for each successive exposure. The fundamental requirement when this is done is that all points of the image formed at the position of 46 is viewable through the slit mask as the observation point is scanned around the slit. Clearly, when the width of the slit mask is less than the width of the focal band, this will not occur. This situation can be created, however, by using a horizontal dispersion element 45 in conjunction with lens 46.

In FIG. 4, the dashed lines illustrate the dispersion of the two top rays 8b and 9b by element 45. In order to make all parts of the image viewable through the slit mask, it is simply required that the dispersive power of element 45 be sufficient to cover the slit mask from all points in the plane of lens 46. This is equivalent to requiring that the dispersive power be such that the dispersed ray bundle width be approximately equal to or slightly greater than the width of the focal band of lens 46 at the plane of the slit mask. Although not as light utilization efficient as the multiple exposure technique, this system can be made quite efficient by utilizing a reasonably good lens and keeping the dispersive power of element 45 to the required minimum. With the use of element 45 the only function of lens 46 is to make more efficient utilization of the available laser light in the subject beam. The multiplexed hologram could be just as easily formed with the use of the horizontal dispersion element in the absence of lens 46. In this case, however, the dispersive power of element 45 would have to be considerably greater, since it is required that light rays from all points in the plane of element 45 arrive at the slit.

To further increase the light utilization efficiency of the system, cylindrical lenses are placed between the film and each of the spatial filters in the reference beams to bring the reference beam to a line focus onto the slit 49.

The use of element 45 in conjunction with lens 46 also has the useful property of eliminating gaps between the horizontal plane exit pupils of the system. When lens 46 is used alone as the horizontal exit pupil forming means, gaps appear between the exit pupils of the individual frames or exposures. These gaps result from the specular illumination of the image in the plane of lens 46 and the limited entrance pupil diameter of the eye. The gaps are eliminated when the image rays in the horizontal plane are diffuse or are dispersed.

The optical systems in FIGS. 1 and 2 may be used to produce a black and white motion multiplex hologram by exposing the film with only one of the reference beams and illuminating the hologram with a white light source from the reference beam source point. A color hologram is produced by exposing the film with all three reference beams from lasers of three colors and illuminating the hologram with colored light sources placed at the three reference beams source points, the color of the reference beam, as shown in FIG. 5. Lamps 95B, 95G and 95R each with clear incandescent light bulbs with color filters make an adequate source for this color scheme.

The reference beam angles $\alpha$, $\beta$ and $\gamma$ in FIG. 1 are chosen so that there is no cross talk between the images of the three different colors. That is, so that the green image is not reconstructed by the blue source and so on. An alternate approach to the use of a color transparency and three reference beams from three lasers of different wavelengths is to use a single laser of convenient wavelength and to use three black and white transparencies exposed in normal light with red, green, and blue filters placed in front of the camera for the three exposures. This approach is procedurally more complex but does offer the advantage of requiring only one laser wavelength and makes possible the use of recording materials which are not panchromatic.

The production scheme of FIG. 1 is particularly well suited to the Land two color process of achieving a color image wherein a red image is superimposed over a black and white image to produce a full color scene.

The technique of sequentially exposing the hologram film with the lasers at three different wavelengths by moving mirrors in and out of the beam path is shown for illustrative purposes only. All three images could be holographically recorded simultaneously by replacing mirrors 64 and 74 with appropriately coated dielectric beam splitters. The diffraction efficiency of the hologram can be increased, however, by sequentially recording the images and advancing the hologram film one framewidth between each color recording. In this manner, each strip area of the hologram film contains only one recording and the diffraction efficiency is maximized. When this approach is used, the framewidth must be made small enough to allow adequate superposition of the different colored images to produce an acceptable quality image.

This method of sequentially recording the red, green and blue images in successive strips is compatible with the color mask approach to suppressing cross talk images. In this technique a color filter consisting of a series of red, green, and blue filter strips corresponding to the red, green, and blue hologram strips is placed in contact with the hologram between the film and illumination source. All three color holograms are recorded with the same reference beam angle and the hologram is illuminated with a single white light source placed at the reference beam source point.

Figure 6:
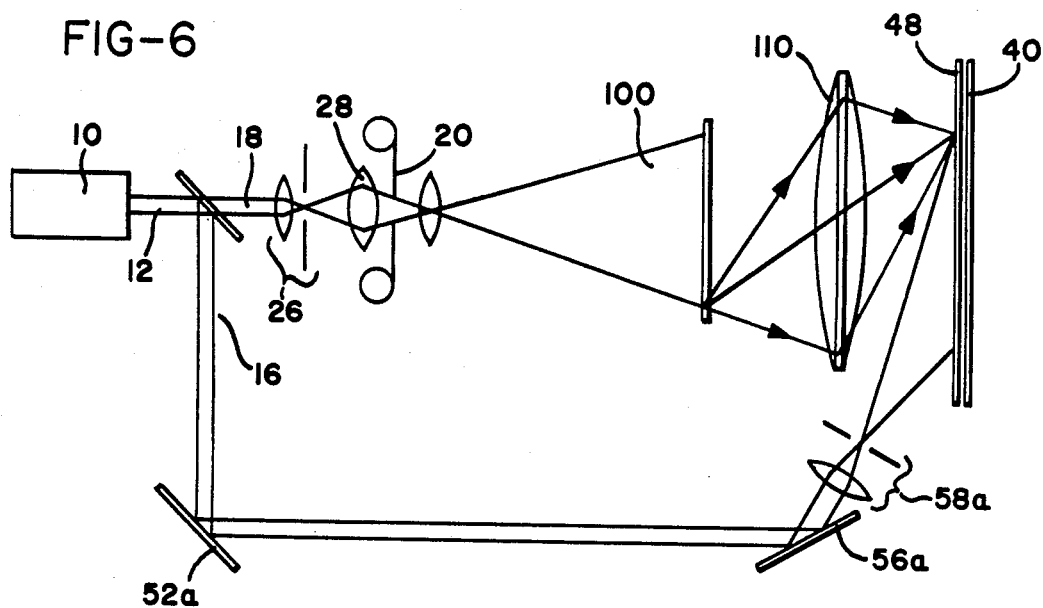
FIG. 6 is an optical system diagram in the vertical plane showing another embodiment of the invention wherein a diffuse screen is used as both the vertical dispersion element and the horizontal exit pupil forming means.

In the diffuse screen configuration shown in FIG. 6, the image on film transparency 20 is focused onto a transmitting diffusing screen 100. In the vertical plane, the screen image is then transferred to the plane of the film 40 by a cylindrical lens 110 whose power acts in the vertical plane. In order to keep the image size the same on the film as it is on the diffusing screen, the lens 110 is placed such that both the diffusing screen 110 and the film 40 are a distance of $2 f_c$ from the lens where $f_c$ is the focal length of the cylindrical lens. The reference beam 16 is incident on the film in the vertical plane.

Figure 7:
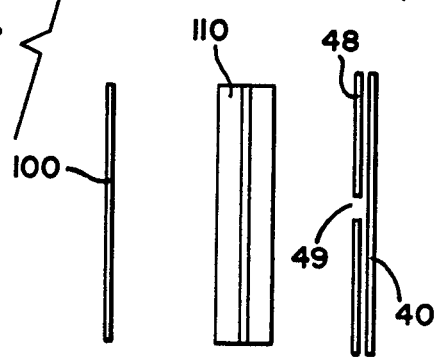
FIG. 7 is a view in the horizontal plane of the horizontal exit pupil forming means of FIG. 6.

In the horizontal plane, as shown in FIG. 7, the cylindrical lens 110 has no power, and the rays emanating from the screen in this plane are not altered.

This optical configuration yields all three features required to produce a motion hologram viewable with an incandescent bulb. The subject image is removed from the film plane in the horizontal plane, the image is located at the film plane in the vertical plane, and it is possible to view the entire image on the diffuse screen through the slit by moving the view point around the slit 49 in mask 48. The exit pupil in the horizontal plane is defined by the slit 19, the width of the screen image, and the distance of the screen from the slit. In the vertical plane the exit pupil is limited by the aperture stop formed by the cylindrical lens 110. The vertical exit pupil can be made quite large with a low f number lens 110.

Figure 8:
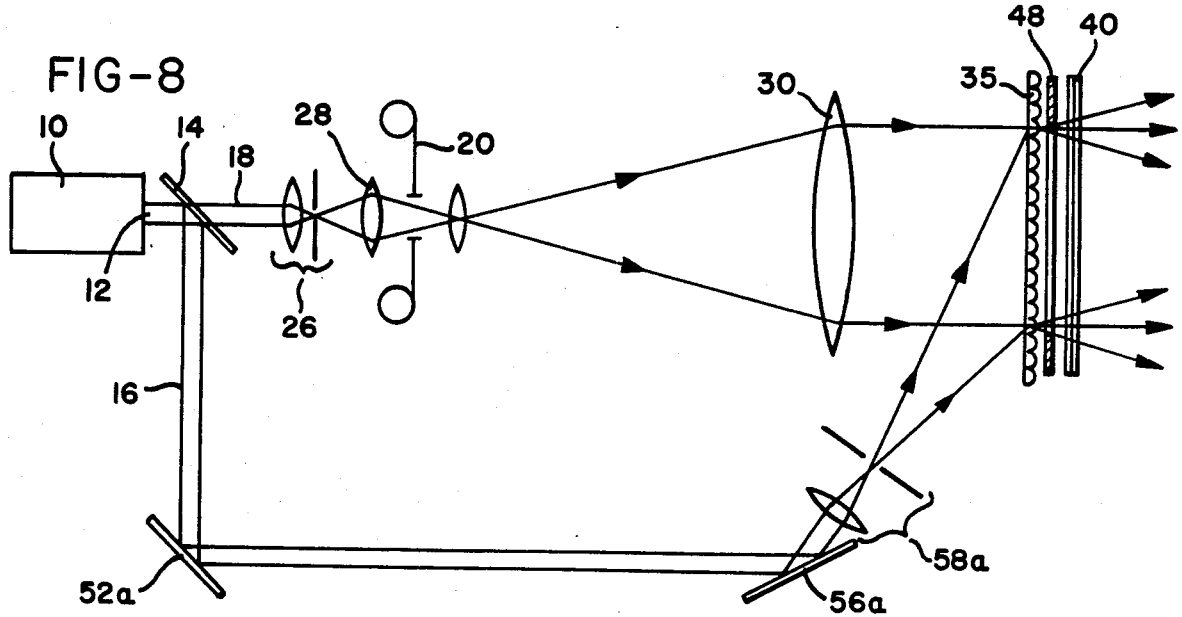
FIG. 8 is another embodiment of the invention wherein the vertical dispersion element is placed adjacent a recording medium.

In the optical configuration shown in FIGS. 1, 2, 6 and 7, the vertical dispersion means is separated from the plane of the film, and the image on the vertical dispersion element is reimaged onto the film in the vertical plane by additional optical elements. Dispersion of the image rays in the vertical plane may also be accomplished by placing the vertical dispersion element 35 adjacent to the film as shown in FIG. 8. In this embodiment, again, an image of the three dimensional object or subject transparency is formed on the vertical dispersion element 35 in the vertical plane and on the horizontal exit pupil forming means in the horizontal plane.

Figure 9:
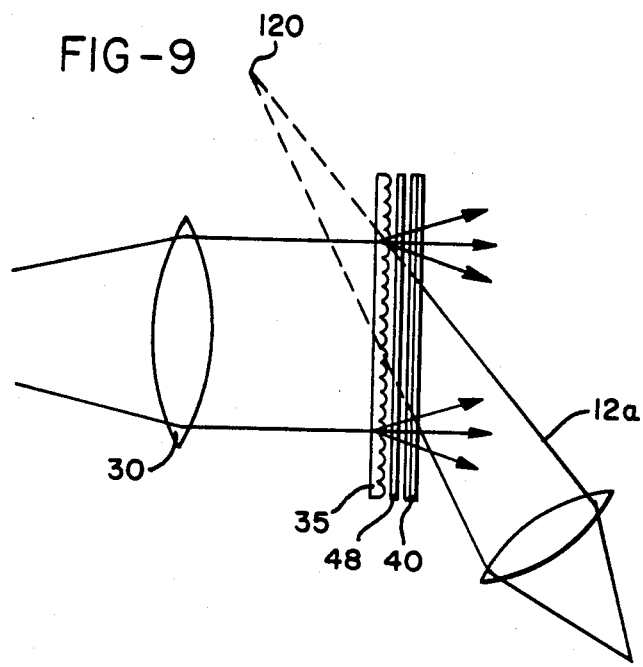
FIG. 9 is another embodiment of the invention wherein the vertical dispersion element is placed adjacent the recording medium and wherein the reference beam is made incident from the back of the medium.
Figure 10:
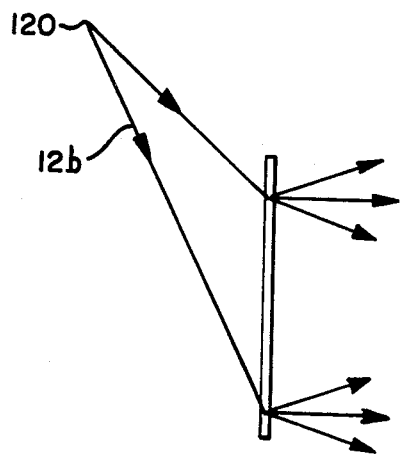
FIG. 10 illustrates the reconstruction of an image hologram formed by the apparatus of FIG. 9.

In this configuration, when the reference beam 16 is incident on the film from the front (same side as image beam), the reference beam is also dispersed by the vertical dispersion element 35. Image rays will be reconstructed by illuminating the resulting hologram from a plurality of angles, and suppression of cross talk images by separation of reference beam angles is not possible. This difficulty is removed by making the reference beam 12a incident on the back of the film (side opposite the image beam) as shown in FIG. 9. The hologram is viewed in transmission by illuminating it from the conjugate source point as shown in FIG. 10. A converging reference beam 12a is used to match the wavefront curvature of the illumination beam 12b diverging from the conjugate source point 120.

The volume hologram produced with the back reference beam may also be viewed in reflection. In this case a full color image may be produced with all three reference beams incident from the same angle and the hologram illuminated by a single white light source placed at the reference beam source point. For the reflection hologram a diverging reference beam would be used. If the recording medium is thick enough, cross talk images do not occur due to the wavelength selection properties of the reflection hologram.

The back reference beam technique has a number of disadvantages, however: volume fringes are less stable than the fringes produced with a front reference beam, thereby requiring greater stability of the optical setup for the back reference beam hologram; emulsion shrinkage produces a shift in the volume fringes causing difficulties on the illumination of the hologram; and finally, images produced by the back reference beam hologram when viewed in transmission are not as bright as those images produced by the front reference beam hologram when viewed in transmission.

Figure 11:
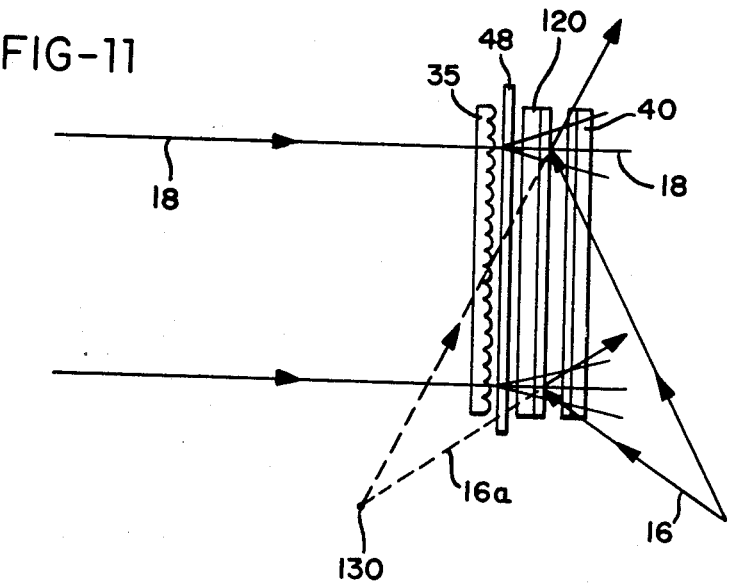
FIG. 11 is another embodiment of the invention employing a partially silvered mirror between the vertical dispersion element and the recording medium and wherein the reference beam is directed from the back of the recording medium to permit viewing of the hologram as in FIG. 5 or 10.

These difficulties can be eliminated with the arrangement shown in FIG. 11. This figure only shows the optical elements in the film plane area and the subject and reference beams incident in this region. All other elements of the optical system, the projection system, and focusing lenses, the cylindrical image forming lens, and the subject and reference beam optics are the same as previously described. The object beam is incident from the left upon the vertical dispersion element 35 which is shown in the figure as a lenticular screen with the grooves running in the horizontal plane. As previously mentioned, this element could be a properly prepared diffraction grating or any other element which has the property of diffusing rays in the vertical plane while leaving rays in the horizontal plane unaltered.

The vertically dispersed object beam rays 18 are then incident upon the hologram film through a slit mask 48 and a partially reflecting beam splitter mirror 120. The reference beam 16, incident upon the hologram film from the back, passes through the emulsion striking the partially reflecting mirror 120 and is reflected back into the emulsion. That part of the reference beam 16, incident upon the film from the back, produces a volume hologram fringe system while the portion of the reference beam reflected from the partially reflecting mirror and passing back into the emulsion produces a front reference beam fringe system. It is the hologram produced by the reflected reference beam that is of interest here.

The mirror beam splitter 120 and the film emulsion are placed in intimate contact or are index matched to prevent unwanted reflections. The reflectivity of the beam splitter is not critical, but it should be made relatively high, in the range of 80 to 90 percent, in order to maximize the efficiency of the front reference beam hologram with respect to the back reference beam hologram produced with this scheme.

The beam splitter 14 which divides the laser beam into the object beam paths and reference beam paths is adjusted to achieve the proper balance of object beam and reflected reference beam intensities so as to maximize the efficiency of the front reference beam hologram produced. The apparent source direction of the reference beam reflected from the mirror beam splitter is shown by the dashed lines 16a.

When viewing the hologram, an illumination source is placed at point 130 for viewing the hologram in transmission. A color hologram is produced by multiply exposing the hologram film with lasers of three different colors and with the three reference beams originating from three different angles to produce color separation of the images. The same portion of the film may be exposed three times at the three different wavelengths or the film may be transported one slit width between each exposure at the three wavelengths.

As used herein, the vertical and horizontal planes are related to the hologram when it is normally viewed and does not necessarily refer to the actual horizontal and vertical planes during the making of the hologram. For practical reasons, it is sometimes more convenient to rotate the apparatus shown in FIG. 2 by 90° in order to support the optical elements shown in their proper relation to each other; and in this case, both the film and the object will also be rotated by 90°. When reconstructed, however, the film will be placed in its normal viewing position.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention which is defined in the appended claims.

What is claimed is:

1. Apparatus for recording a holographic image of an object on a photosensitive medium including:
   means for generating a coherent beam of light;
   means for splitting said beam of light into a reference beam and an image beam;
   means for directing said image beam toward the object to be recorded;
   dispersion means for dispersing light in the vertical plane;
   means for focusing the image of said object in the vertical plane onto said dispersion means;
   means for focusing the image on said dispersion means in said vertical plane onto or near said medium;
   means forming a horizontal exit pupil;
   means for focusing the image of said object in the horizontal plane onto or near said horizontal exit pupil forming means and directing the light therefrom onto said medium; and
   means for simultaneously directing said reference beam onto said medium at a predetermined angle in the vertical plane.

2. The apparatus of claim 1 wherein said dispersion means is a diffusing screen.

3. The apparatus of claim 1 wherein said dispersion means is a lenticular screen.

4. The apparatus of claim 1 wherein said dispersion means is a ruled transmission diffraction grating.

5. The apparatus of claim 1 wherein said dispersion means is a holographic diffraction grating.

6. The apparatus of claim 1 wherein said means forming a horizontal exit pupil is a diffusing screen.

7. The apparatus of claim 1 wherein said vertical dispersion means is placed adjacent the photosensitive medium.

8. The apparatus of claim 7 wherein said vertical dispersion means is a lenticular screen.

9. The apparatus of claim 1 wherein said vertical dispersion means is displaced from the photosensitive medium and wherein said apparatus further includes anamorphic lens means for focusing the image of said object on said dispersion means onto or near the plane occupied by the photosensitive medium.

10. The apparatus of claim 1 wherein said reference beam is directed onto said medium on the same side as the image beam.

11. The apparatus of claim 1 wherein said means forming a horizontal exit pupil includes a horizontal dispersion element, and wherein said image of said object in a horizontal plane is focused onto said horizontal dispersion element and the light therefrom is directed onto said medium.

12. The apparatus of claim 1 wherein said means forming a horizontal exit pupil includes an anamorphic lens for directing the light in the horizontal plane to a focal band in the vicinity of the medium.

13. The apparatus of claim 1 wherein said means forming a horizontal exit pupil includes an anamorphic lens for directing the light in the horizontal plane to a focal band in the vicinity of the medium and a mask having means forming a vertically arranged slit.

14. The apparatus of claim 1 further including a mask having means forming a vertically arranged slit, and means for advancing said medium horizontally an amount at least equal to the width of said slit prior to each successive exposure.

15. A method of recording a holographic image of an object on photographic medium including the steps of
splitting a beam of coherent light into a reference beam and an image beam,
directing said image beam toward the object;
focusing the image of the object in the vertical plane onto a dispersive element;
focusing the image of the dispersive element in the vertical plane onto or near the plane of said medium;
focusing the image from said object in a horizontal plane onto horizontal exit pupil forming optics and directing the light therefrom onto said medium; and
simultaneously illuminating said medium with said reference beam at a predetermined angle in the vertical plane.

16. A method of claim 15 further including the steps of reproducing said image recorded on said medium by illuminating the medium with light directed at the medium at the same angle as said reference beam.

17. The method of claim 15 wherein said object is a transparency and wherein said image beam is directed through said transparency.

18. The method of claim 15 wherein said object is a three dimensional object.

19. Apparatus for recording a holographic image of an object on photosensitive medium including:
means for generating a coherent beam of light;
means for splitting said beam of light into a reference beam and an image beam;
means for directing said image beam toward the object to be recorded;
a diffuse screen;
means for focusing the image of said object in both the vertical and the horizontal planes onto said diffuse screen;
means for focusing the image on said diffuse screen in said vertical plane onto or near the plane of said medium while the light from said diffuse screen in the horizontal plane is incident on said medium without being focused thereon; and
means for simultaneously directing said reference beam onto said medium at a predetermined angle in the vertical plane.

20. Apparatus for recording a holographic image of an object on photosensitive medium including:
means for generating a coherent beam of light;
means for splitting said beam of light into a reference beam and an image beam;
means for directing said image beam toward the object to be recorded;
first directional dispersion means for dispersing light in the vertical plane;
means for focusing the image of said object in the vertical plane onto said vertical dispersion means;
means for focusing the image on said dispersion element in said vertical plane onto or near the plane of said medium;
second directional dispersion means for dispersing light in the horizontal plane;
means for focusing the image of said object in the horizontal plane onto said horizontal dispersion means whereby the light from said horizontal dispersion means is directed onto said medium; and
means for simultaneously directing said reference beam onto said medium at a predetermined angle in the vertical plane.

21. The apparatus of claim 20 wherein said reference beam is directed onto said medium from the same side as said image beam.

22. Apparatus for recording a holographic image of an object on photosensitive medium including:
means for generating a coherent beam of light;
means for splitting said beam of light into a reference beam and an image beam;
means for directing said image beam toward an object to be recorded;
first directional dispersion means for dispersing light in the vertical plane;
lens means for focusing the image of said object in the vertical plane onto said vertical dispersion means;
lens means for focusing the image on said dispersion element in said vertical plane onto or near the plane of said medium;
second directional dispersion means for dispersing light in the horizontal plane;
means for focusing the image of said object in the horizontal plane onto said horizontal dispersion means;
an anamorphic horizontal exit pupil forming lens;
a mask including means forming a vertical slit therein, said mask being positioned near the minimum focal band of said horizontal exit pupil forming lens;
means for positioning said medium near said mask; and
means for simultaneously directing said reference beam onto said medium at a predetermined angle in the vertical plane.

23. Apparatus for recording a holographic image of an object on photosensitive medium including:
means for generating a coherent beam of light;
means for splitting said beam of light into a reference beam and an image beam;
means for directing said image beam toward the object to be recorded;
first directional dispersion means for dispersing light in the vertical plane;
lens means for focusing the image of said object in the vertical plane onto said vertical dispersion means;
lens means for focusing the image on said dispersion element in said vertical plane onto or near the plane of said medium;
lens means for directing the image of said object in the horizontal plane onto horizontal exit pupil means including
an anamorphic horizontal exit pupil forming lens;
a mask including means forming a vertical slit therein, said mask being positioned near the minimum focal band of said horizontal exit pupil forming lens,
means for positioning said photosensitive medium adjacent said mask, and means for simultaneously directing said reference beam onto said medium at a predetermined angle in the vertical plane.

24. The apparatus of claim 23 further including cylindrical lens means in the path of said reference beam to concentrate the light within said slit.

25. Apparatus for recording a holographic image of an object on photosensitive medium including:
   means for generating a coherent beam of light;
   means for splitting said beam of light into a reference beam and an image beam;
   means for directing said image beam toward the object to be recorded;
   first directional dispersion means for dispersing light in the vertical plane;
   lens means for focusing the image of said object in the vertical plane onto said vertical dispersion means;
   lens means for focusing the image on said dispersion element in said vertical plane onto or near the plane of said medium;
   lens means for focusing the image of said object in the horizontal plane onto horizontal exit pupil means including
      a horizontal dispersion element, and
      a mask including means forming a vertically arranged slit,
      wherein the dispersive power of said horizontal dispersion element is sufficient to direct rays through the slit from all parts of the dispersion element in the horizontal plane,
   means for supporting said medium adjacent said mask, and
   means for simultaneously directing said reference beam onto said medium at a predetermined angle in the vertical plane.

26. Apparatus for recording a full color holographic image on photosensitive medium which is capable of being viewed from a wide vertical viewing angle when illuminated by incoherent light, said apparatus including
   means for generating a plurality of coherent beams of light at different colors,
   means for splitting said beam of light into reference beams and image beams,
   means for directing each image beam toward an object to be recorded,
   means for dispersing light in the vertical plane,
   means for focusing the image of the object in the vertical plane onto said dispersing means,
   means for focusing the image formed on said dispersing means in the vertical plane onto or near the plane of the medium,
   a horizontal dispersion element,
   means for focusing the image of the object in the horizontal plane onto said horizontal dispersion element,
   anamorphic lens means for gathering the light from said horizontal dispersion element and directing it toward said medium, and
   a mask, including means forming a vertical slit therein, positioned near the minimum focal band of said anamorphic lens and adjacent said medium,
   means for advancing said medium horizontally by an amount at least equal to the width of the image formed on said medium as it is exposed through said mask prior to each successive exposure, and
   means for simultaneously directing said reference beams onto said medium at separate predetermined angles in the vertical plane.

27. Apparatus for recording a holographic image of an object on photosensitive medium including:
   means for generatig a coherent beam of light;
   means for splitting said beam of light into a reference beam and an image beam;
   means for directing said image beam toward the object to be recorded;
   first directional dispersion means for dispersing light in the vertical plane;
   lens means for focusing the image of said object in the vertical plane onto said vertical dispersion means;
   lens means for focusing the image on said dispersion element in said vertical plane onto or near the plane of said medium;
   lens means for focusing the image of said object in the horizontal plane onto horizontal exit pupil means including a horizontal dispersion element having dispersive power sufficient to direct rays from all parts of the dispersion element in the horizontal plane onto said medium;
   means for supporting said film to receive the dispersed light from said horizontal dispersion element; and
   means for simultaneously directing said reference beam onto said medium at a predetermined angle in the vertical plane.

28. A photosensitive medium having recorded thereon a holographic image wherein light from an object in the vertical plane is focused onto a vertical dispersion element and that image is focused on or near the plane of said photosensitive medium and wherein the light from the object in the horizontal plane is focused on a plane displaced from the plane of said medium.

29. The photosensitive medium of claim 23 wherein said vertical dispersion element is a diffuse screen.

30. The photosensitive medium of claim 23 wherein said vertical dispersion element is a lenticular screen.

31. The photosensitive medium of claim 23 wherein said vertical dispersion element is placed adjacent said medium.

32. The photosensitive medium of claim 23 wherein said vertical dispersion element is displaced from said film and wherein lens means is used to focus the image in the vertical plane at or near the plane of the medium.

33. A photosensitive medium having recorded thereon a holographic image capable of being viewed from wide vertical viewing angle when illuminated by incoherent light, wherein the holographic image on said medium in the vertical viewing plane is light from an object which has been dispersed in the vertical plane and thereafter focused onto or near the plane of the medium and wherein the recorded image in the horizontal plane is diffuse light from the object which has been focused on a plane displaced from said medium.

34. A photosensitive medium having recorded thereon a holographic image capable of being viewed from a wide vertical viewing angle when illuminated by incoherent light, wherein the holographic image on said medium in the vertical viewing plane is light from an object which has been dispersed in the vertical plane and thereafter focused onto or near the plane of the medium, and wherein the image on said medium in the horizontal viewing plane is light from the object which has been focused onto horizontal exit pupil forming means.

35. The photosensitive medium of claim 34 wherein the horizontal exit pupil forming means includes
an anamorphic horizontal exit pupil forming lens, and
a mask, including means forming a vertical slit therein, said mask being positioned near the medium and at or near the minimum focal band of said horizontal exit pupil forming lens.

36. The photosensitive medium of claim 25 wherein said horizontal exit pupil forming means includes
an anamorphic horizontal exit pupil forming lens, and
a second directional dispersion means for dispersing the light in the horizontal plane toward said medium.

37. The photographic medium of claim 34 wherein said horizontal exit pupil means includes a horizontal dispersion element having dispersive power sufficient to direct rays from all parts of the dispersive element onto said medium.

* * * * *